United States Patent [19]
Goto et al.

[11] Patent Number: 5,532,726
[45] Date of Patent: Jul. 2, 1996

[54] THERMAL RECORDING APPARATUS FOR RECORDING AN IMAGE OF STABLE DENSITY WITHOUT AN INCREASE IN LASER OUTPUT POWER

[75] Inventors: Yasuhiko Goto; Toshitaka Agano; Shinji Imai, all of Kanagawa, Japan

[73] Assignee: Fuji Photo Film Co., Ltd., Kanagawa, Japan

[21] Appl. No.: 22,274

[22] Filed: Feb. 25, 1993

[30] Foreign Application Priority Data

Feb. 27, 1992 [JP] Japan ..................................... 4-041702

[51] Int. Cl.$^6$ ............................ B41J 2/47; G01D 15/14; G02B 26/00; G02B 27/00
[52] U.S. Cl. ......................................................... 347/243
[58] Field of Search .................................... 346/108, 160; 358/298, 296; 503/201; 376/76; 347/241, 243, 244

[56] References Cited

U.S. PATENT DOCUMENTS

| | | | |
|---|---|---|---|
| 4,605,606 | 8/1986 | Ferrante | 372/9 |
| 4,924,321 | 5/1990 | Miyagawa et al. | 358/296 |
| 5,140,342 | 8/1992 | Metlidi et al. | 347/232 |
| 5,140,343 | 8/1992 | Yang | 347/256 |
| 5,296,439 | 3/1994 | Maruyama et al. | 503/201 |

FOREIGN PATENT DOCUMENTS

| | | |
|---|---|---|
| 50-23617 | 3/1975 | Japan . |
| 58-94494 | 6/1983 | Japan . |
| 62-77983 | 4/1987 | Japan . |
| 62-78964 | 4/1987 | Japan . |

Primary Examiner—Benjamin R. Fuller
Assistant Examiner—Raquel Yvette Gordon
Attorney, Agent, or Firm—Sughrue, Mion, Zinn, Macpeak & Seas

[57] ABSTRACT

Images or other information is recorded by a thermal recording apparatus on a thermosensitive recording medium which has a support coated with a coloring agent, a color developer, and light-absorbing dyes, and produces color whose density depends on thermal energy that is applied to the thermosensitive recording medium. The thermal recording apparatus has a plurality of laser beam generators for generating respective laser beams, and an optical scanning system for scanning the thermosensitive recording medium with the laser beams at respective different positions thereon. One of the laser beam generators produces a laser beam to scan the thermosensitive recording medium earlier than the laser beams generated by the other laser beam generators, and the laser beam has a thermal energy which is high enough to enable the thermosensitive recording medium to produce the color. The laser beam generators apply the respective laser beams at different incident angles to the optical scanning system.

17 Claims, 4 Drawing Sheets ing an image or other information on a thermosensitive recording medium with a plurality of laser beams emitted from a plurality of laser beam generating devices.

THERMAL RECORDING APPARATUS FOR RECORDING AN IMAGE OF STABLE DENSITY WITHOUT AN INCREASE IN LASER OUTPUT POWER

BACKGROUND OF THE INVENTION

1. Field of the Invention

The present invention relates to a thermal recording apparatus for recording an image or other information on a thermosensitive recording medium with a plurality of laser beams emitted from a plurality of laser beam generating devices.

2. Description of the Related Art

Thermosensitive recording apparatus for applying thermal energy to a thermosensitive recording medium to record an image or other information thereon are in wide use. Particularly, thermosensitive recording apparatus which employ a laser output source as a thermal energy source for high-speed recording are known from Japanese laid-open patent publications Nos. 50-23617, 58-94494, 62-77983, and 62-78964, for example.

The applicant has developed a thermosensitive recording medium capable of recording a high-quality image for use in such thermosensitive recording apparatus. The thermosensitive recording medium comprises a support coated with leuco dye, a color developer, and light-absorbing dyes, and produces color whose density depends on the thermal energy that is applied to the thermosensitive recording medium. The applicant has also developed an apparatus for recording an image or other information on the thermosensitive recording medium with a laser beam. For details, reference should be made to Japanese patent applications Nos. 3-62684 and 3-187494.

The thermosensitive recording medium has a thermosensitive layer on the support. The thermosensitive layer is produced by coating a coating solution on the support. The coating solution contains an emulsion which is prepared by dissolving thermally fusible microcapsules containing at least leuco dye, a color developer, and light-absorbing dyes into an organic solvent that is either slightly water-soluble or water-insoluble, and then emulsifying and dispersing the dissolved materials.

The leuco dye produces color by donating electrons or accepting protons from an acid or the like. The basic dye precursor comprises a compound which is normally substantially colorless and has a partial skeleton of lactone, lactam, sultone, spiropyran, ester, amide, or the like, which can be split or cleaved upon contact with the color developer. Specifically, the compound may be crystal violet lactone, benzoil leucomethylene blue, malachite green lactone, rhodamine B lactam, 1,3,3-trimethyl- 6'-ethyl-8'-butoxyindolino-benzospiropyran, or the like.

The color developer for the leuco dye may be of an acid substance such as a phenolic compound, an organic acid or its metal salt, oxybenzoate, or the like. The color developer should preferably have a melting point ranging from 50° C. to 250° C. Particularly, it should be of a slightly water-soluble phenol or organic acid having a melting point ranging from 60° C. to 200° C. Specific examples of the color developer are disclosed in Japanese laid-open patent publication No. 61-291183.

The light-absorbing dyes should preferably comprise dyes which absorb less light in a visible spectral range and have a particularly high rate of absorption of radiation in an infrared spectral range. Examples of such dyes are cyanine dyes, phthalocyanine dyes, pyrylium and thiopyrylium dyes, azulenium dyes, squarylium dyes, metal complex dyes containing Ni, Cr, etc., naphtoquinone and anthraquinone dyes, indophenol dyes, indoaniline dyes, triphenylmethane dyes, triallylmethane dyes, aminium and diimmonium dyes, nitroso compounds, etc. Of these dye materials, those which have a high radiation absorption rate in a near-infrared spectral range whose wavelength ranges from 700 nm to 900 nm are particularly preferable in view of the fact that practical semiconductor lasers have been developed for generating near-infrared laser radiation.

In order to keep the thermosensitive recording medium in stable storage, the thermosensitive recording medium is designed such that it does not produce color with thermal energy whose level is lower than a certain threshold value. Therefore, the laser output source is required to produce a considerable thermal energy for enabling the thermosensitive recording medium to produce a desired color.

When the thermosensitive recording medium is thermally fused, the materials thereof are dispersed to react with each other for producing a color. Consequently, it is preferable to maintain the thermosensitive recording medium at a color-producing temperature for a certain period of time.

However, since the thermosensitive recording medium has heretofore been scanned with a single laser beam having a Gaussian distribution, each pixel on the thermosensitive recording medium undergoes an abrupt temperature change owing to the Gaussian beam. Therefore, it has been difficult to produce color with a stable density on the thermosensitive recording medium.

SUMMARY OF THE INVENTION

It is therefore the object of the present invention to provide a thermal recording apparatus which is capable of recording an image or other information of stable density without requiring laser beam generators to increase their laser output power.

According to the present invention, there is provided a thermal recording apparatus for recording information on a thermosensitive recording medium which has a support coated with a coloring agent, a color developer, and light-absorbing dyes, and produces color whose density depends on thermal energy that is applied to the thermosensitive recording medium, the thermal recording apparatus comprising a plurality of laser beam generating means for generating a plurality of respective laser beams, and an optical scanning system for scanning the thermosensitive recording medium with the laser beams at respective different positions thereon.

One of the laser beam generating means may comprise means for generating a laser beam to scan the thermosensitive recording medium earlier than the laser beams generated by the other laser beam generating means, the laser beam having a thermal energy which is high enough to enable the thermosensitive recording medium to produce the color.

The laser beam generating means may comprise means for applying respective laser beams at different angles to the optical scanning system.

Each of the laser beam generating means may comprise a plurality of laser beam output sources for generating a plurality of respective laser beams, and combining means for combining the laser beams generated by the laser beam output sources into a single laser beam. The combining means may comprise a holographic element.

The optical scanning means may comprise light deflecting means for deflecting the laser beams to scan the thermosensitive recording medium with the deflected laser beams. The light deflecting means may comprise a polygonal mirror.

According to the present invention, there is also provided a thermal recording apparatus for recording information on a thermosensitive recording medium with a thermal energy that is applied to the thermosensitive recording medium, comprising laser beam generating means for generating a plurality of simultaneous laser beams, and optical scanning means for scanning the thermosensitive recording medium with the laser beams at respective different positions thereon along a scanning direction at each point of time in a scanning cycle.

The laser beam generating means may comprise means for generating one of the laser beams to scan each pixel on the thermosensitive recording medium earlier than the other laser beams, the one of the laser beams having a thermal energy which is high enough to enable the thermosensitive recording medium to produce the color.

The laser beam generating means may comprise means for applying the laser beams to the optical scanning means with angular differences therebetween.

According to the present invention, there is also provided a thermal recording apparatus for recording information on a thermosensitive recording medium with a thermal energy that is applied to the thermosensitive recording medium, comprising laser beam generating means for generating a plurality of laser beams, and optical scanning means for scanning each pixel on the thermosensitive recording medium along a scanning direction successively with the laser beams.

The laser beam generating means may comprise means for generating one of the laser beams with a thermal energy which is high enough to enable the thermosensitive recording medium to produce the color, and wherein the optical scanning means comprises means for scanning the each pixel on the thermosensitive recording medium with the one of the laser beams earlier than the other laser beams.

The laser beam generating means may comprise means for applying the laser beams to the optical scanning means with angular differences therebetween.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
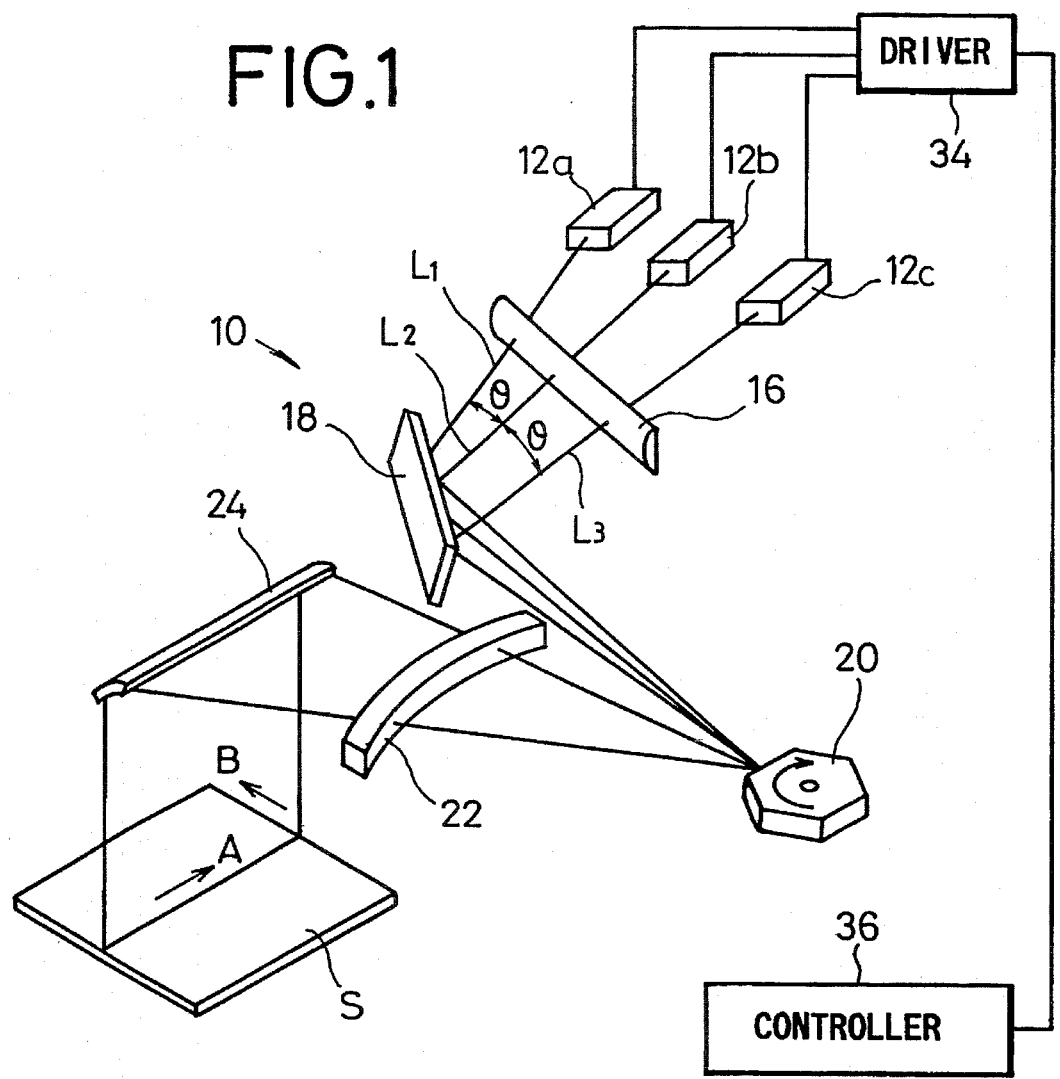
FIG. 1 is a schematic perspective view, partly in block form, of a thermal recording apparatus according to the present invention.

As shown in FIG. 1, a thermal recording apparatus 10 according to the present invention scans a thermosensitive recording medium S with three laser beams $L_1$ through $L_3$ in a main scanning direction indicated by the arrow A while the thermosensitive recording medium S is being fed in an auxiliary scanning direction indicated by the arrow B which is perpendicular to the main scanning direction A. The thermosensitive recording medium S comprises a support coated with leuco dye, a color developer, and light-absorbing dyes, and produces color whose density depends on the thermal energy that is applied to the thermosensitive recording medium, as disclosed in Japanese patent applications Nos. 3-62684 and 3-187494.

The thermal recording apparatus 10 comprises three laser beam generators 12a, 12b, 12c for generating the laser beams $L_1$ through $L_3$, respectively, a cylindrical lens 16 for passing the laser beams $L_1$ through $L_3$ therethrough, a reflecting mirror 18 for reflecting the laser beams $L_1$ through $L_3$, a polygonal mirror 20 for deflecting the laser beams $L_1$ through $L_3$, an fθ lens 22 for passing the laser beams $L_1$ through $L_3$ therethrough, and a cylindrical mirror 24 for reflecting the laser beams $L_1$ through $L_3$. The cylindrical lens 16 and the cylindrical mirror 24 cooperate with each other in compensating wobbling of surfaces of the polygonal mirror 20. The laser beam generators 12a, 12b, 12c are controlled by a controller 36 through a driver 34.

The laser beams $L_1$ through $L_3$ emitted by the laser beam generators 12a, 12b, 12c are directed to fall on the reflecting mirror 18 with predetermined angular differences θ therebetween.

Figure 2:
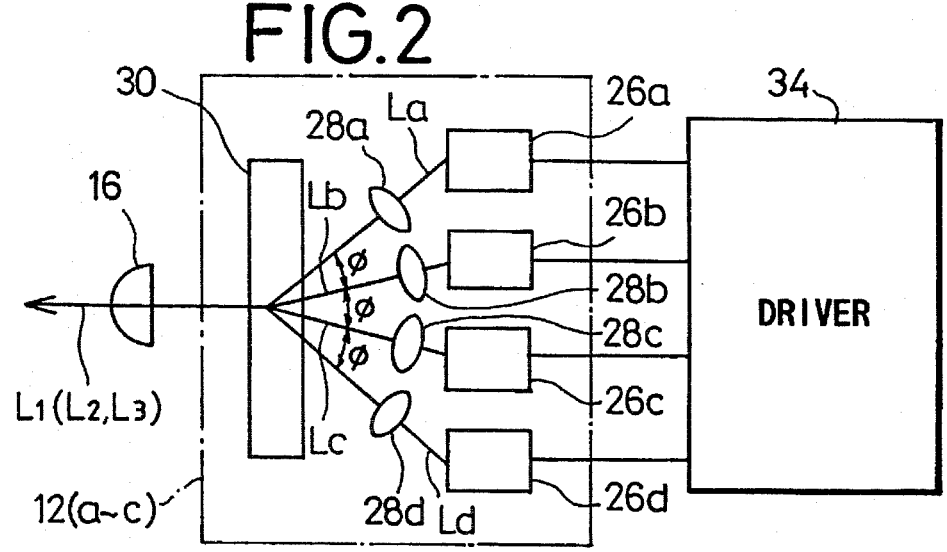
FIG. 2 is a block diagram of a laser beam generator of the thermal recording apparatus shown in FIG. 1.

As shown in FIG. 2, each of the laser beam generators 12a, 12b, 12c comprises four laser diodes 26a, 26b, 26c, 26d as laser output sources for emitting respective laser beams La, Lb, Lc, Ld. The laser beams La, Lb, Lc, Ld emitted by the laser diodes 26a, 26b, 26c, 26d are applied through respective collimator lenses 28a, 28b, 28c, 28d to a holographic device 30 as a wave combiner with predetermined angular differences φ. The holographic device 30 combines the laser beams La, Lb, Lc and Ld into a laser beam as one of the laser beams $L_1$ through $L_3$.

Figure 3:
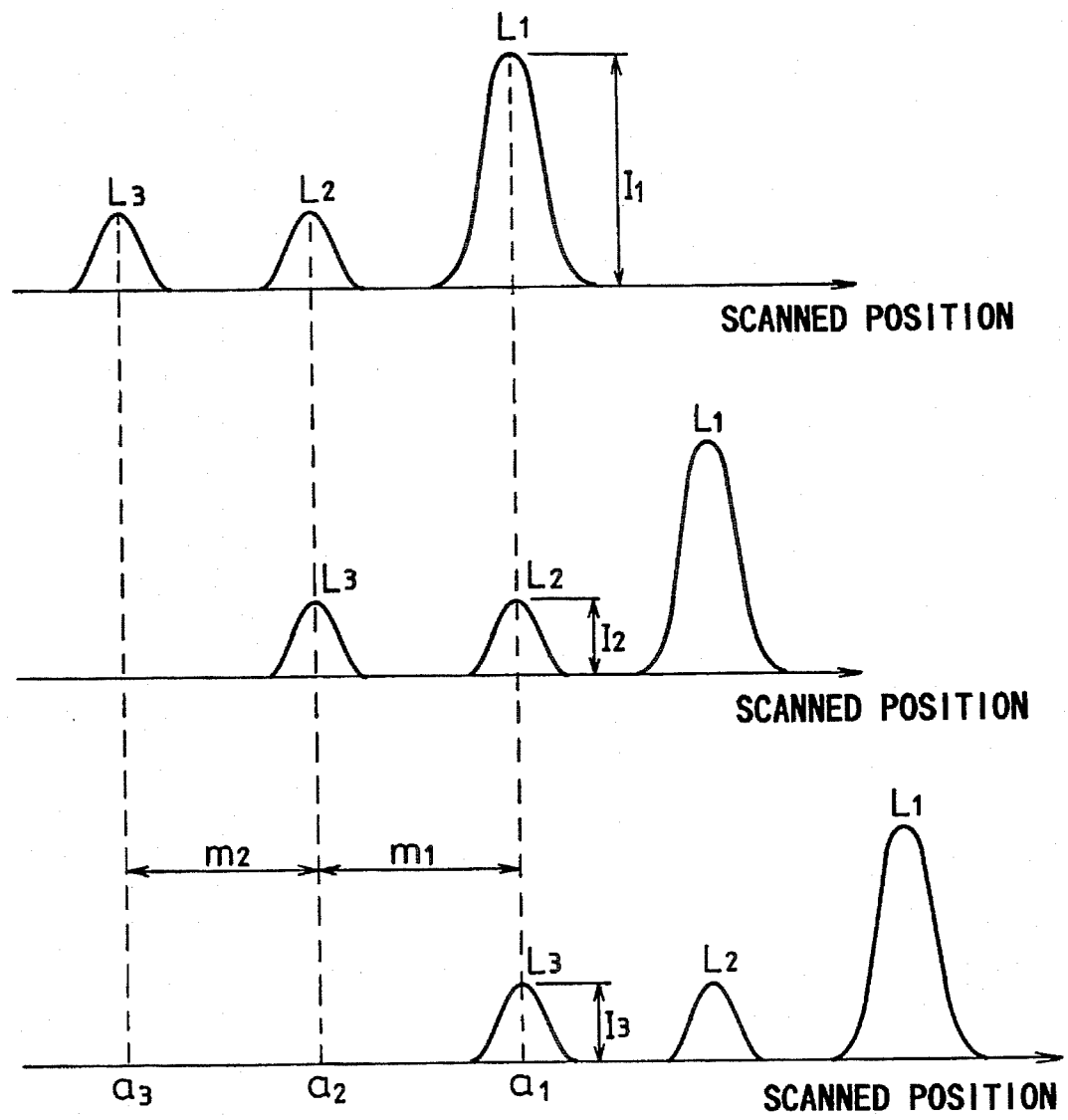
FIG. 3 is a diagram showing positions where a thermosensitive recording medium is scanned with laser beams.

As shown in FIG. 3, the laser beams $L_1$ through $L_3$ have respective intensities $I_1$, $I_2$, $I_3$, and the intensity $I_1$ of the laser beam $L_1$ is set higher than the intensities $I_2$ or $I_3$ of the laser beams $L_2$ or $L_3$ so that the laser beam $L_1$ can heat the thermosensitive recording medium S to a temperature higher than a threshold temperature. When the thermosensitive recording medium S is heated to or higher than the threshold temperature, which is indicated at T1 in FIG. 4, the thermosensitive recording medium S produces the color.

The thermal recording apparatus 10 operates as follows:

The controller 36 controls the driver 34 to energize the laser beam generators 12a through 12c. In each of the laser beam generators 12a through 12c, the laser diodes 26a through 26d emit respective laser beams La through Ld that have been modulated according to the gradations of an image to be recorded on the thermosensitive recording medium S. The laser beams La through Ld are converted into respective parallel beams by the collimator lenses 28a through 28d, respectively, and then applied to the holographic device 30 with predetermined angular differences θ therebetween. The holographic device 30 diffracts the applied laser beams La through Ld in a predetermined direction, thereby combining them into a single laser beam as one of the laser beams $L_1$ through $L_3$.

The laser beams $L_1$ through $L_3$ emitted by the respective laser beam generators $12a$ through $12c$ travel through the cylindrical lens 16 and then are reflected toward the polygonal mirror 20 by the reflecting mirror 18. The polygonal mirror 20, which is rotating about its own axis at a high speed, reflects and deflects the laser beams $L_1$ through $L_3$, which then pass through the fθ lens 22 and are reflected toward the thermosensitive recording medium S by the cylindrical mirror 24. Since the laser beams $L_1$ through $L_3$ are deflected by the polygonal mirror 20, they scan the thermosensitive recording medium S in the main scanning direction A at a scanning speed v while the thermosensitive recording medium S is being fed in the auxiliary scanning direction B, thus two-dimensionally recording information on the thermosensitive recording medium S with the modulated laser beams $L_1$ through $L_3$.

The laser beams $L_1$ through $L_3$ are emitted by the respective laser beam generators $12a$ through $12c$ with the angular differences θ and θ therebetween. Therefore, at each point of time in a main scanning cycle, the laser beams $L_1$ through $L_3$ scan the thermosensitive recording medium S at respective different positions thereon along the main scanning direction A. For example, as shown in FIG. 3, when the laser beam $L_1$ records information at a pixel $a_1$ on the thermosensitive recording medium S in the main scanning direction A with the laser beam intensity $I_1$, the laser beam $L_2$ records information at a pixel $a_2$ that is spaced a distance $m_1$ from the pixel $a_1$ along the main scanning direction A with the laser beam intensity $I_2$, and the laser beam $L_3$ records information at a pixel $a_3$ that is spaced a distance $m_2$ from the pixel $a_2$ along the main scanning direction A with the laser beam intensity $I_3$.

Figure 4:
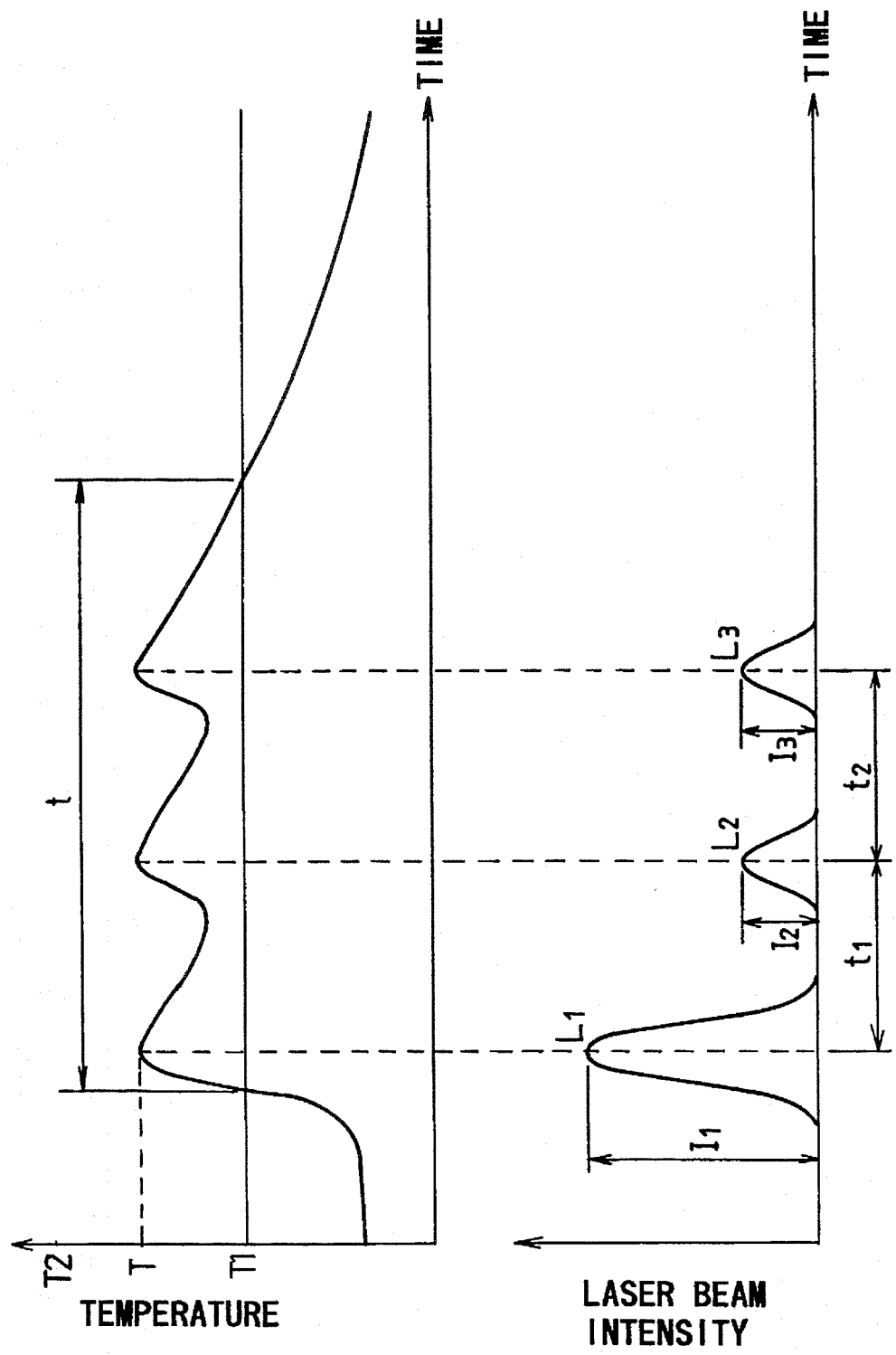
FIG. 4 is a diagram showing the manner in which the temperature and the laser beam intensity at scanned positions on the thermosensitive recording medium vary with time.
Figure 5:
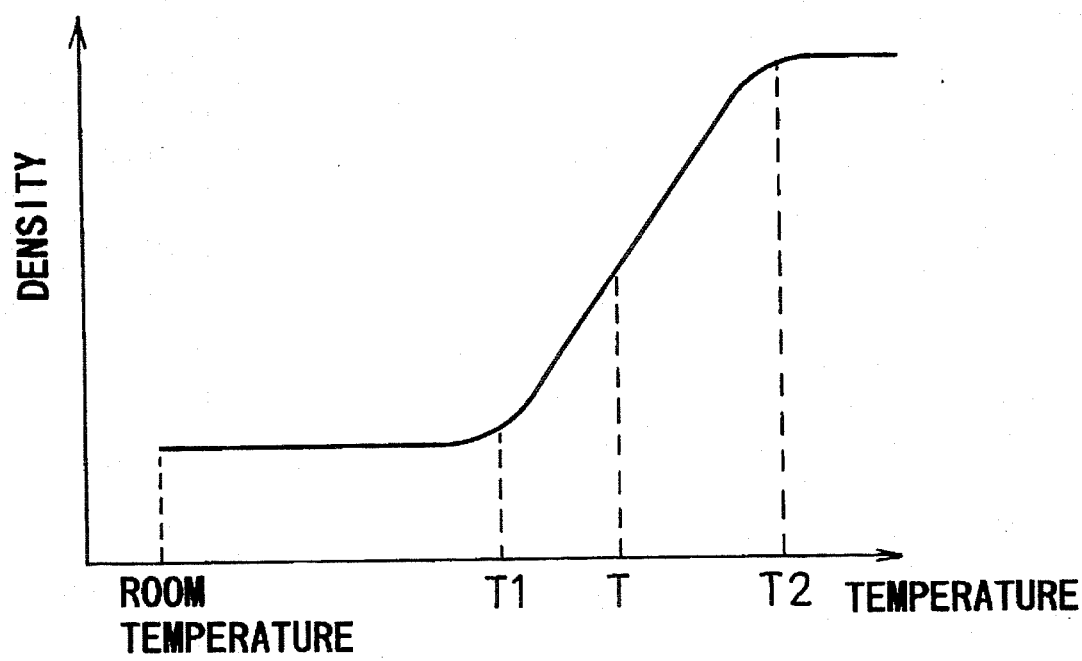
FIG. 5 is a diagram of density vs. temperature characteristics of the thermosensitive recording medium used in the thermal recording apparatus.

As shown in FIG. 4, the laser beam $L_1$ that has reached the pixel $a_1$ first heats the thermosensitive recording medium S up to a temperature T, higher than the threshold temperature T1 and lower than a saturated temperature T2 (also see FIG. 5), with the laser beam intensity $I_1$. Then, the laser beam $L_2$ arrives at the pixel $a_1$ upon elapse of a time $t_1$ $(=m_1/v)$ after the laser beam $L_1$ reached the pixel $a_1$, heating the thermosensitive recording medium S whose temperature has dropped in the time $t_1$, up to a temperature substantially equal to the temperature T with the laser beam intensity $I_2$. Similarly, the laser beam $L_3$ then arrives at the pixel $a_1$ upon elapse of a time $t_2$ $(=m_2/v)$ after the laser beam $L_2$ reached the pixel $a_1$, heating the thermosensitive recording medium S whose temperature has dropped in the time $t_2$, up to a temperature substantially equal to the temperature T with the laser beam intensity $I_3$. As a result, the pixel $a_1$ on the thermosensitive recording medium S is continuously heated substantially to the temperature T higher than the threshold temperature T1 for a period of time t which is long enough for the thermosensitive recording medium S to produce the color with stable density. Therefore, the thermal recording apparatus 10 can record an image or other information with stable density on the thermosensitive recording medium S.

The laser beam intensities $I_1$ through $I_3$ of the laser beams $L_1$ through $L_3$ are determined depending on the density of an image or other information to be recorded on the thermosensitive recording medium S. The times $t_1$ and $t_2$ are governed by the time constant of thermal diffusion in the materials of the thermosensitive recording medium S. If the times $t_1$ and $t_2$ are short, the laser beams $L_1$ through $L_3$ may overlap each other on one scanning line in the main scanning direction A. If the times $t_1$ and $t_2$ are long, the laser beams $L_1$ through $L_3$ may be positioned on different scanning lines in the main scanning direction A.

Although a certain preferred embodiment of the present invention has been shown and described in detail, it should be understood that various changes and modifications may be made therein without departing from the scope of the appended claims.

What is claimed is:

1. A thermal recording apparatus for recording information on a thermosensitive recording medium having a support coated with a coloring agent, a color developer, and light-absorbing dyes, and producing a color having a density depending on an amount of thermal energy that is applied to the thermosensitive recording medium, said thermal recording apparatus comprising:

a plurality of laser beam generating means, each for generating a separate, single laser beam; and an optical scanning means for scanning the thermosensitive recording medium with said separate, single laser beams at respective different positions on the thermosensitive recording medium;

wherein one of said separate, single laser beam scans the thermosensitive recording medium earlier than the other separate, single laser beams and has a thermal energy which is high enough to enable the thermosensitive recording medium to produce the color.

2. A thermal recording apparatus for recording information on a thermosensitive recording medium having a support coated with a coloring agent, a color developer, and light-absorbing dyes, and producing a color having a density depending on an amount of thermal energy that is applied to the thermosensitive recording medium, said thermal recording apparatus comprising:

a plurality of laser beam generating means, each for generating a separate, single laser beam; and an optical scanning means for scanning the thermosensitive recording medium with said separate, single laser beams at respective different positions on the thermosensitive recording medium;

wherein said plurality of laser beam generating means comprise means for applying respective separate, single laser beams at different incident angles to said optical scanning means.

3. A thermal recording apparatus for recording information on a thermosensitive recording medium with a thermal energy that is applied to the thermosensitive recording medium, comprising:

laser beam generating means for generating a plurality of simultaneous laser beams; and optical scanning means for scanning the thermosensitive recording medium with said laser beams at respective different positions on the thermosensitive recording medium along a scanning direction at each point of time in a scanning cycle.

4. A thermal recording apparatus according to claim 3, wherein said laser beam generating means comprises means for generating one of said laser beams to scan each pixel on the thermosensitive recording medium earlier than other laser beams generated by said laser beam generating means, said one of the laser beams having a thermal energy high enough to enable the thermosensitive recording medium to produce color.

5. A thermal recording apparatus according to claim 3, wherein said laser beam generating means comprises means for applying said laser beams to said optical scanning means with angular differences between said laser beams.

6. A thermal recording apparatus for recording information on a thermosensitive recording medium with a thermal energy that is applied to the thermosensitive recording medium, comprising:

a laser beam generating means for generating a plurality of laser beams; and an optical scanning means for scanning each pixel on the thermosensitive recording medium along a scanning direction successively with said laser beams;

wherein said laser beam generating means comprises means for generating one of said laser beams having a thermal energy high enough to enable the thermosensitive recording medium to produce color, and wherein said optical scanning means comprises means for scanning said each pixel on the thermosensitive recording medium with said one of the laser beams earlier than other laser beams generated by said laser beam generating means.

7. A thermal recording apparatus according to claim 6, wherein said laser beam generating means comprises means for applying said laser beams to said optical scanning means with angular differences between said laser beams.

8. A thermal recording apparatus for recording information on a thermosensitive recording medium having a support coated with a coloring agent, a color developer, and light-absorbing dyes, and producing a color having a density depending on an amount of thermal energy that is applied to the thermosensitive recording medium, said thermal recording apparatus comprising:

a first laser beam generating means for generating a first laser beam having a thermal energy high enough to enable the thermosensitive recording medium to produce color;

a second laser beam generating means for generating a second laser beam; and an optical scanning means for scanning the thermosensitive recording medium with said first laser beam, thereby heating the thermosensitive recording medium to a predetermined temperature;

said optical scanning means also for subsequently scanning the thermosensitive recording medium with said second laser beam after a predetermined time so that the thermosensitive recording medium is continuously heated to substantially said predetermined temperature, thereby producing a color with stable density on the thermosensitive recording medium.

9. A thermal recording apparatus according to claim 8, wherein said first laser beam generating means and said second laser beam generating means comprise means for applying said first laser beams and said second laser beam, respectively, to said optical scanning means with angular differences between said first laser beam and said second laser beam.

10. A thermal recording apparatus according to claim 8, wherein said predetermined time is based on a time constant of thermal diffusion of the thermosensitive recording medium.

11. A method for recording information on a thermosensitive recording medium having a support coated with a coloring agent, a color developer, and light-absorbing dyes, and producing a color having a density depending on an amount of thermal energy that is applied to the thermosensitive recording medium, said method comprising the steps of:

generating a first laser beam having a thermal energy high enough to enable the thermosensitive recording medium to produce color;

generating a second laser beam;

scanning the thermosensitive recording medium with said first laser beam, thereby heating the thermosensitive recording medium to a predetermined temperature; and subsequently scanning the thermosensitive recording medium with said second laser beam after a predetermined time so that the thermosensitive recording medium is continuously heated to substantially said predetermined temperature, thereby producing a color with stable density on the thermosensitive recording medium.

12. The method according to claim 11, wherein said predetermined time is based on a time constant of thermal diffusion of the thermosensitive recording medium.

13. A thermal recording apparatus for recording information on a thermosensitive recording medium having a support coated with a coloring agent, a color developer, and light-absorbing dyes, and producing a color having a density depending on an amount of thermal energy that is applied to the thermosensitive recording medium, said thermal recording apparatus comprising:

a first laser beam generating means for generating a first laser beam having a thermal energy high enough to enable the thermosensitive recording medium to produce color;

a second laser beam generating means for generating a second laser beam; and an optical scanning means for scanning said first laser beam on the thermosensitive recording medium, thereby heating the thermosensitive recording medium to a predetermined temperature;

said optical scanning means also for scanning said second laser beam at a different position on the thermosensitive recording medium than the first laser beam so that the thermosensitive recording medium is continuously heated to substantially said predetermined temperature, thereby producing a color with stable density on the thermosensitive recording medium.

14. A thermal recording apparatus as recited in claim 13, wherein said first laser beam generating means and said second laser beam generating means comprise means for applying said first laser beam and said second laser beam at different incident angles to said optical scanning means.

15. A thermal recording apparatus according to claim 13, wherein said first laser beam generating means and said second laser beam generating means comprise means for applying said first laser beam and said second laser beam, respectively, to said optical scanning means with angular differences between said first laser beam and said second laser beam.

16. A thermal recording apparatus as recited in claim 13, wherein each of said first and said second laser beam generating means comprise a plurality of laser beam output sources for generating a plurality of respective preliminary laser beams, and combining means for combining the plurality of respective preliminary laser beams generated by said laser beam output sources into said first laser beam and said second laser beam, respectively; and wherein said combining means comprises a holographic element.

17. A method for recording information on a thermosensitive recording medium having a support coated with a coloring agent, a color developer, and light-absorbing dyes, and producing a color having a density depending on an amount of thermal energy that is applied to the thermosensitive recording medium, said method comprising the steps of:

generating a first laser beam having a thermal energy high enough to enable the thermosensitive recording medium to produce color;

generating a second laser beam;

scanning said first laser beam on the thermosensitive recording medium, thereby heating the thermosensitive recording medium to a predetermined temperature;

scanning said second laser beam at a different position on the thermosensitive recording medium than the first laser beam so that the thermosensitive recording medium is continuously heated to substantially said predetermined temperature, thereby producing a color with stable density on the thermosensitive recording medium.

* * * * *